United States Patent [19]

Schaub et al.

[11] Patent Number: 5,117,801
[45] Date of Patent: Jun. 2, 1992

[54] COMBUSTION SYSTEM FOR DUAL FUEL ENGINE

[75] Inventors: Frederick S. Schaub, Mt. Vernon; Jesse G. Smith, Fredericktown, both of Ohio

[73] Assignee: Cooper Industries, Inc., Houston, Tex.

[21] Appl. No.: 604,797

[22] Filed: Oct. 26, 1990

Related U.S. Application Data

[63] Continuation-in-part of Ser. No. 434,023, Nov. 9, 1989, Pat. No. 4,966,103.

[51] Int. Cl.$^5$ .............................................. F02B 13/00
[52] U.S. Cl. .................................... 123/575; 123/276
[58] Field of Search ................ 123/575, 276, 276 E, 123/1 R, 1 A, 2, 525, 277, 279

[56] References Cited

U.S. PATENT DOCUMENTS

| | | | |
|---|---|---|---|
| 4,612,905 | 9/1986 | Dietrich et al. | 123/575 |
| 4,799,465 | 1/1989 | Yanagisawa et al. | 123/276 |
| 4,831,993 | 5/1989 | Kelgard | 123/575 |

*Primary Examiner*—Raymond A. Nelli
*Attorney, Agent, or Firm*—Laff, Whitesel, Conte & Saret

[57] ABSTRACT

We provide a torch fuel cell for a dual gas-liquid fuel engine, the torch fuel cell being positioned internally of the variable volume chamber formed by the cylinder, piston and cylinder head which accepts and is adapted to compress the air/gas mixture forming the main fuel source. Preferably, the torch fuel cell is carried by the piston at, or adjacent to, the end face thereof. Suitable means are provided to deliver liquid fuel into an auto-ignition chamber in the fuel cell and other means for delivering the thermal and chemical products of such auto-ignition into the variable volume chamber to ignite the main gaseous fuel source.

23 Claims, 2 Drawing Sheets

COMBUSTION SYSTEM FOR DUAL FUEL ENGINE

This is a continuation-in-part application of the allowed application filed Nov. 9, 1989, Ser. No. 07/434,023, now Pat. No. 4,966,103 for COMBUSTION SYSTEM FOR DUAL FUEL ENGINE. This invention relates to an improved combustion system for dual fuel engines.

BACKGROUND OF THE INVENTION

Stationary reciprocating engines operating on natural gas or other gaseous fuels use energy for ignition from a spark or from a small pilot quantity (typically five percent of the total fuel) of a liquid fuel having an adequate cetane number (typically diesel fuel oil) injected directly into the combustion chamber. The pilot ignited engines serve the major industrial markets since they exceed the spark ignited engines in durability and rating capability and offer convertibility to and from full diesel fueling while in operation. These pilot ignited engines are referred to as "gas diesel" or "dual fuel" engines.

Although the pilot ignited engine represents the most fuel efficient prime mover in commercial use at this time, these engines exhibit objectionable levels of exhaust emissions which are detected by analytical procedures and observed visually as yellow in color. Extensive work at the research level has related the objectional emission levels to the competition of the liquid pilot fuel and the primary gaseous fuel for available oxygen. This competition for oxygen favors the gaseous fuel bulk and starves the fraction of the pilot fuel resulting in high levels of emissions from the liquid fuel.

SUMMARY OF INVENTION

An object of the present invention is to control exhaust emissions, i.e., control yellow haze in dual fuel mode, as well as to generally extend control of other exhaust emissions.

Another object of the present invention is to improve fuel consumption, to improve power quality, and to extend the application of the dual fuel engine line.

A further object of the present invention is to bring about the above objects in a simplistic fashion that is cost effective, that establishes the durability of components and provides a flexibility of application of the invention.

The allowed original application, on which this continuation-in-part is based, relates to a torch cell assembly having the torch cell chamber external to, but communicating with, the chamber formed by the piston, cylinder walls, and cylinder head.

The present improvements set forth hereinafter include configurations having the torch cell chamber integral with the piston. The injector that provides the fluid fuel to said torch cell is external to the cylinder chamber.

Still another object of the present invention is to provide a minimum of clutter to the limited space available in the cylinder head while still providing means for optimum ignition of the main chamber fuel lean gaseous fuel mixture at the time of maximum compression at or near the top of the compression stroke.

A further object of the present invention is to provide a piston design having an internal, integral torch cell on or near the face of said piston, so that the innovative piston can be readily utilized in retrofit situations by merely adding a small torch cell fuel injector in the main cylinder head and replacing any standard piston with the new improved piston disclosed herein.

Other objects will become apparent to those skilled in the art when the specification is read in conjunction with the attached drawings, wherein:

DETAILED SPECIFICATION

Figure 1:
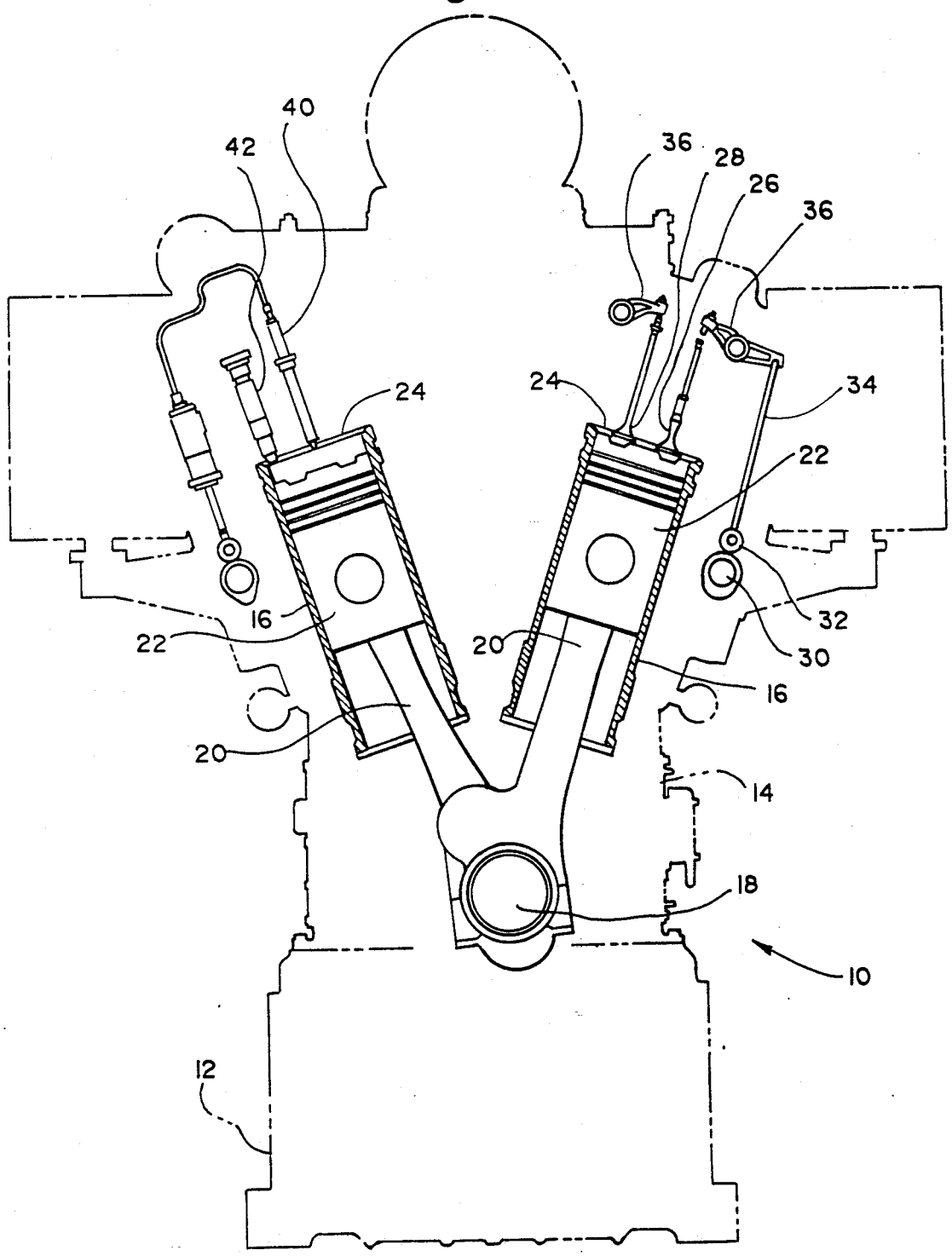
FIG. 1 is a transverse elevational view in partial cross-section of a typical V-type, four-cycle engine design engineered for high-horsepower, continuous-duty operation.

Referring now to the drawings, particularly FIG. 1, a typical engine 10 of the type with which the present invention is contemplated to be used includes a base 12 that supports a centerframe 14 on which is mounted a plurality of cylinders blocks 16 disposed in a spaced "V" arrangement relative to said centerframe. Preferrably, said base, said centerframe, and said plurality of cylinder blocks are each manufactured in one piece to provide maximum rigidity and permanent alignment when joined. An axially disposed power crankshaft 18 is mounted in said centerframe, supported by suitable bearings along its length, and is joined by connecting rods 20 to complimentary pistons 22 each disposed within the bore of a cylinder block 16. Each cylinder is blocked at its upper end by a suitable head 24 that normally includes two inlet valves 26 and two exhaust valves 28, preferably, the valve seats are of the insert type and made of high-heat-resistant material. The valves are operated by suitably timed camshafts 30 engaging cam rollers 32 having pushrods 34 and acting through rockers 36, or other suitable means, to actuate the valves in timed relation. Disposed generally on the axis of the cylinder head 24 intermediate the valves 26 and 28 is a fuel injection nozzle 40, as is normal in standard diesel type engines. Also, the injecter 40 may be a multi-hole injecter as shown in the co-pending application of Helmeich entitled LOW EMISSION DUAL FUEL ENGINE AND METHOD OF OPERATING SAME. There is also the additional valve 42 for starting the single fuel diesel engine by moving the cylinders by compressed air until the compressive force of the pistons will heat the air and fuel mixture to the point of ignition when the combustion takes place in a normal operating fashion.

The dual fuel engine of FIG. 1 is a LSVB four cycle engine manufactured by Cooper-Bessemer, a Division of Cooper Industries, the assignee of this invention. The dual fuel engines include a plurality of cylinders and are typically built with 12, 16, or 20 cylinders.

The present invention, while contemplating usage of an engine of the type described above, and as shown generally in FIG. 1, is directed to an improved dual fuel engine. More particularly, these inventions relate to an engine fueled by gaseous fuel and having at least one torch cell, preferably two, for each cylinder that is ignited by a relatively small quantity of liquid pilot fuel.

In the co-pending allowed application, of which the present application is a continuation-in-part, the torch cell assembly includes an externally disposed auto-ignition chamber that is generally a segmented sphere-paraboloid shape and usually the volume would typically represent one to five percent of the volume of the main chamber defined by the piston 22, the cylinder head 24 and the walls of the cylinder 16 at the top of the piston's stroke, however, the size of ignition chamber can run as high as twenty-five percent of the volume of the main cylinder chamber when the stroke is at its uppermost position. Such a torch cell chamber would provide adequate delivery of thermally and chemically active species to ignite the lean fuel contents of the main chamber. (Lean burning is an effective control mechanism for certain emissions particularly from gaseous fuel.)

Such a torch cell is an auto-ignition fuel cell—i.e., an external fuel cell which only has an auto-ignition chamber and excludes the use of a spark means (i.e., spark plug) or similar external ignition means in direct communication with the chamber.

The present improvement contemplates the design of an internal fuel cell chamber that is integral with the piston at or adjacent the upper face of the piston and adapted to accept fuel from an external injector through suitable means into the auto-ignition fuel cell.

Figure 2:
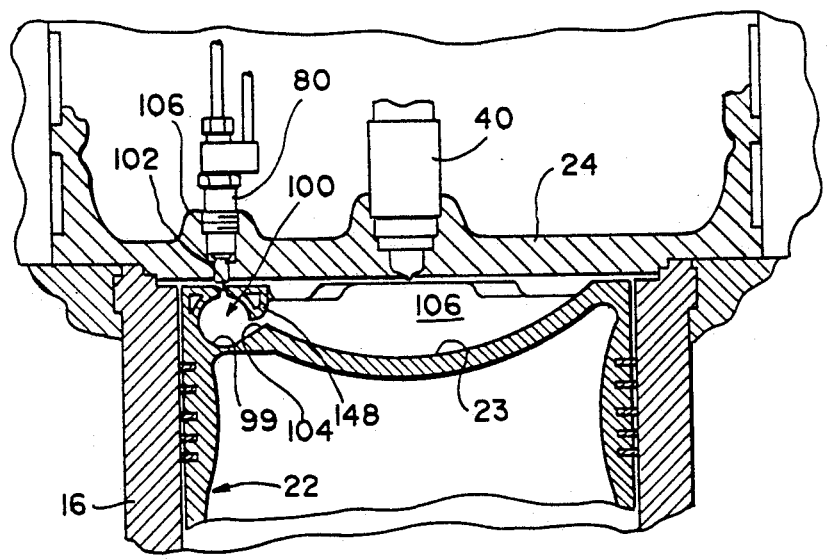
FIG. 2 is a schematic elevational view in partial section of the improvement contemplated in the present invention, wherein the auto-ignition fuel cell is integral with the piston and located in or adjacent the upper face of the piston, and having means for communicating with the injecter, in this embodiment being located in the cylinder head.
Figure 4:
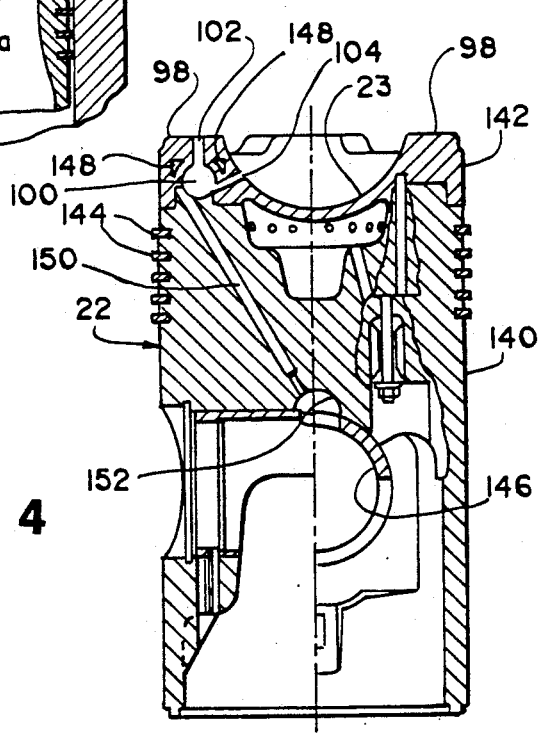
FIG. 4 is a elevational view in section of a piston of the type contemplated for use in the present invention.

FIG. 2 illustrates a first embodiment schematically in partial section and particularly shows the chamber 106 formed by a cylinder 16, a head 24 and a piston 22 at the top or approaching the top of its stroke. As best seen in FIG. 4, the pistons 22 utilized with this invention preferably have a truncated spherical configuration in their upper end surface or face 23. The piston may be of the one piece cast variety or may be of the two piece configuration illustrated with a hardened steel head 142 forming the face 23 being fastened to the piston trunk 140. Suitable sealing rings 144 are provided as well as a bushing variety of bearing 146 for the piston pin, not shown, for transmission of power.

The head 142 forming face 23 includes at least one lateral segment 98 that is hollow and has an internal spherical wall 99 forming an auto-ignition chamber 100. A first passageway 102 communicates with chamber 100 and the end face of the piston head segment 98, while a second passageway 104 communicates at one end with chamber 100 and at the opposite end with the variable volume combustion main chamber 106 formed by the segmented spherical face 23, the cylinder wall 16 and the engine head 24.

The engine head 24 is provided with suitable external means such as a hub 106 having a threaded through bore capable of complimentary acceptance of a liquid fuel injecter 80. Hub 106 serves to retain and align the nozzle of injector 80 so that it will timely discharge a predetermined amount of liquid fuel into the first passageway 102 communicating with the fuel torch cell chamber 100 when piston 22 reaches the top, or nearly the top, of its stroke. As the air/gas mixture is fed into main combustion chamber 106 and is compressed and heated, it also is compressed within chamber 100 through first and second passageways 102,104, until the piston 22 reaches the top, or nearly the top, of its stroke, followed by injection of the liquid pilot fuel into chamber 100 by the injector 80. The heat of the compressed air or the heat from the surface 99 of chamber 100 will ignite the liquid pilot fuel in the fuel torch cell chamber 100 which is then expelled via passageway 104 into the main combustion chamber 106 where the main fuel gas is ignited. Since the main fuel is gas, cell cooling of some form must be considered to control pre-ignition or detonation. To this end, a plurality of cavities 148 are provided in proximity to the fuel cell chamber 100. The cavities 148 surrounding the auto-ignition chamber 100 are connected by suitable passage means 150 to the normal cooling oil supply for the piston, as at 152.

Figure 3:
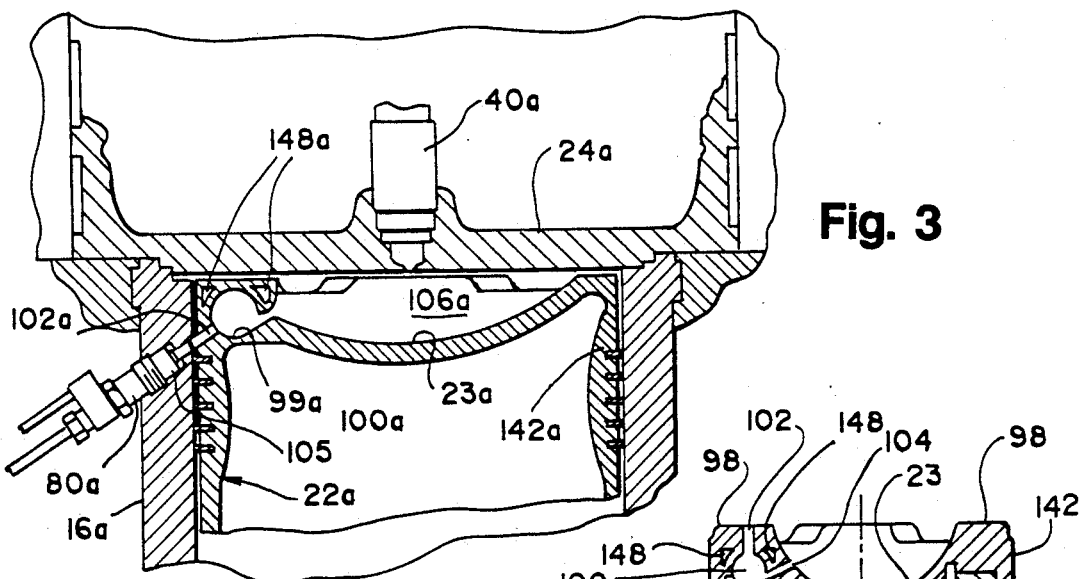
FIG. 3 is a schematic elevational view in partial section of a second embodiment of the present invention wherein the auto-ignition fuel cell is located in or adjacent the upper face of the piston, and with an injecter located in the cylinder wall adjacent to the upper end of the piston stroke and means communicating between said fuel cell and injecter through said cylinder wall and piston.

A second embodiment of the present invention can be best seen schematically in FIG. 3, wherein similar parts will be designated with similar numerals with addition of the suffix "a". In this embodiment, hub 106 and the axially disposed first passageway 102 used in the first embodiment are modified by moving them from the engine head 24a to an angulated position where the injecter 80a is angularly upwardly directed and maintained in this position in a threaded through bore 105. The first passageway 102a extends through the sidewall of piston head 142a and is aligned with bore 105, whereby liquid fuel can be discharged by injector 80a in timed relation into auto-ignition chamber 100a for igniting and discharged from chamber 100a into the gaseous main fuel in chamber 106a. Maintenance of temperature in the chamber 100a to prevent pre-ignition is also controlled in this embodiment by means of the passage of piston cooling oil through the chamber passages 148a.

While a single torch fuel cell is described above for both embodiments it should be noted that the use of multiple fuel cells for each cylinder is contemplated by the present invention. The location of the cell/cells on or adjacent to the face of the piston can be adjusted from the center thereof, on the axis of the piston, or to any other desired location laterally thereof out to the radial edge of the piston illustrated herein.

This invention can also be utilized on a two cycle engine as well as a four cycle engine. The diameter of pistons utilized in such engines are generally in the range of 6-20 inches with the particular stroke not being of prime importance. In the operation of the gas mode, the torch fuel cell is continuously being ignited. It is preferable to use a rich fuel mixture, which means less than a 10 to 1 air to fuel ratio, That is, a preferable ratio is 8 to 1. A lean mixture would be greater than the 10 to 1 ratio of air, meaning approximately 12 to 1.

The cetane rating of the liquid fuel should be such that it will ignite under a predetermined temperature and pressure. The air/gas mixture rating preferably is such that it would not ignite under such predetermined pressure alone and therefore, it is necessary to utilize the liquid fuel torch cell. The torch cell and its liquid fuel are so designed that it will ignite under the pressure of the materials being compressed in the cell chamber. While connected by the communicating bore 104 between the chamber 100 and the main piston chamber 106 the torch cell 100 receives the hot compressed gases from the compression stroke of the piston 22 and these are brought into the chamber 100 in a swirling flow by the tangential disposition of the bore 104, the liquid fuel is introduced angularly relative to the flow of compressed air/gas mixture and will either ignite from the heat of the mixture or will ignite when it contacts the wall of the chamber 100 and will immediately flow both chemically as well as thermally out the bore 104 and serve to ignite the compressed gaseous fuel in the main chamber 106.

The torch cell also will provide a rich controlled fuel burning within the torch cell. (Rich burning is also an effective control mechanism for certain emissions including oxides of nitrogen and including liquid fuels.)

The torch cell will further allow the use of a very small quantity of liquid fuel since the function of the liquid fuel can now be directed to the simple ignition of the easily ignited controlled mixture of the torch cell.

By use of this invention the task of providing energy to ignite the lean main combustion chamber has been shifted from the direct injection of liquid pilot fuel into the combustion chamber, to, a controlled combustion torch cell with energy provided predominantly by gaseous fuel and easily ignited by a small quantity of liquid pilot fuel.

Scavenging of the torch cell and gaseous fuel admission to the torch cell are accomplished by pressure changes within the engine cylinder during the expansion and compression events but aids to scavenging fuel admission may be provided by timed or untimed valving and or porting using common or separate sources of air and or fuel relative to said torch cell, but not shown in these drawings.

Ignition of the torch cell is normally accomplished by injection of a quantity of fuel (ignition substance) with sufficient auto-ignition capability (cetane number) to accomplish start of combustion upon penetration to the torch cell air/fuel mixture which has been raised to a given temperature by cylinder compression. Ignition may also be initiated by contact of the ignition substance with the hot surface of the torch cell. Any of several types of externally powered heaters may also be employed, as well as by elimination or controlling the volume of cooling oil passing through the chambers 148.

Fuel oil with an acceptable cetane rating is currently available at a cost effective level for the ignition substance but other liquids or gases may be selected based on ignition capability, emission control characteristics or economics. The small quantity of ignition substance required by the torch cell will make practical the use of substances other than now conventional fuel oil.

An important further application of the invention is to allow use of lower engine compression ratios to accommodate sensitive fuel (low octane). The ignition source (torch cell) can be made to be more or less dependent on the heat generated by compression and therefore be tailored to function with specific applications. Heat sink detail and use of externally powered heat sources offer wide flexibility.

Full diesel engine capability is retained with this invention by use of conventional injection equipment 40 installed in the cylinder head 24 and provided with cooling, as is well known, to preserve functional capability while on standby. Switching during operation to and from full diesel mode operation would incorporate standard procedures currently available.

Other variations and mechanical equivalents will become apparent to those skilled in the art when this specification is read in conjunction with the appended claims and the intent is for such claims to be read as broadly as permitted by existing art.

We claim:
1. An improved combustion system for dual fuel engines including a reciprocating engine including at least one cylinder, at least one piston, and at least one cylinder head forming a variable volume chamber, said engine being capable of utilizing both a gaseous fuel as well as a liquid fuel, the ignition of said liquid fuel being accomplished by compression and auto-ignition, while the ignition of the preferable gaseous fuel being accomplished by a liquid torch fuel cell disposed internally within said variable volume chamber, said torch fuel cell being carried by said piston, means for introducing a liquid fuel through said cylinder wall adjacent the point of maximum compression by said piston when at or adjacent its uppermost stroke, first passageway means communicating through said piston wall into said torch fuel cell, second passageway means commuinicating from said torch fuel cell into said variable volume chamber for thermally and chemically carrying the product of auto-ignition of said liquid fuel into said variable volume chamber for ignition of said main gaseous fuel.

2. An improved combustion system for dual fuel engines as claimed in claim 1 wherein said auto-ignition chamber has a volume of from 1 to 25% of the volume of a main piston chamber measured when a piston in the piston chamber is at the top of said piston's stroke.

3. An improved combustion system for dual fuel engines as claimed in claim 2 wherein the ignition of said torch cell being normally accomplished by injection of a quantity of fuel with auto-ignition capability to accomplish start of combustion upon penetration to the torch cell by said passageway means of air/fuel mixture which has been raised to a given temperature by cylinder compression in said at least one cylinder.

4. An improved combustion system for dual fuel engines as claimed in claim 3 wherein ignition is initiated by contact of the liquid fuel ignition substance with the hot surface of said torch cell.

5. An improved combustion system for dual fuel engines as claimed in claim 1, wherein said second passageway communicating with said torch fuel cell chamber is substantially tangentially disposed relative to said torch fuel cell chamber whereby air/fuel mixture compressed by said piston and introduced via said passageway into said torch fuel cell chamber is swirled therein.

6. An improved combustion system for dual fuel engines as claimed in claim 5 wherein said torch cell assembly includes injection means for introducing said liquid fuel into said torch fuel cell chamber, said injection means as radially disposed relative to the axial diametrical disposition of said spherical chamber.

7. An improved combustion system for dual fuel engines as claimed in claim 1 wherein said injection means is disposed substantially on the said axis of said chamber.

8. An improved combustion system for dual fuel engines as claimed in claim 1 wherein said injection means is aligned with a first passageway that communicates with said torch cell chamber, said first passageway forming an opening into said chamber on one side of said axis, while said tangentially disposed passageway communicating with said cylinder chamber is located on the other side of said axis, whereby introduction of said ignition means into said torch cell chamber takes place in a following manner generally emulating the rotation of the swirling compressed air from said at least one cylinder.

9. An improved combustion system for dual fuel engines including a reciprocating engine including at least one cylinder, at least one piston, and at least one cylinder head forming a variable volume chamber, said engine being capable of utilizing both a gaseous fuel as well as a liquid fuel, the ignition of said liquid fuel being accomplished by compression and auto-ignition, while the ignition of the preferable gaseous fuel being accomplished by a liquid torch fuel cell disposed internally within said variable volume chamber, said liquid torch fuel cell being carried by said piston, means for timely introduction of a liquid fuel through the walls forming said variable volume chamber into a first passageway in said fuel cell communicating with an auto-ignition chamber in said fuel cell and means for communicating with and serving as the vehicle for transfer of the thermal and chemical ignition products from said auto-ignition chamber to said variable volume chamber, and said first passageway being located in cooperative alignment with liquid fuel delivery means traversing said cylinder head.

10. An improved combustion system for dual fuel engines as claimed in claim 9 wherein said torch fuel cell includes an internal generally spherical auto-ignition chamber, a passageway communicating between said torch cell chamber and the main variable volume chamber of at least one cylinder in said reciprocating engine, and means for introducing liquid fuel into said torch cell chamber when said piston is at or near its uppermost position following compression stroke.

11. An improved method of combustion for a dual fuel reciprocating engine including the steps of emitting a gaseous fuel mixture into the chamber of a cylinder of said engine, compressing said gaseous fuel mixture by means of a reciprocating piston within said cylinder, igniting said compressed fuel mixture at the top of the compression stroke within said cylinder chamber by means of a liquid fuel torch cell disposed internally of said cylinder and carried by said piston, wherein said torch cell includes passageway means that communicates with the said cylinder chamber, including the step of introducing a portion of said compressed gaseous mixture into said torch cell via said passageway means, and then introducing an auto-ignition liquid fuel into cell via a second passageway thereby causing ignition of said liquid fuel upon contact with said compressed mixture and ignition of said compressed gaseous mixture in said cylinder chamber via said first passageway means.

12. The improved method set forth in claim 11 wherein said gaseous mixture in said cylinder chamber is a fuel lean mixture.

13. The improved method as set forth in claim 12 wherein said liquid fuel mixture in said torch cell chamber is a fuel rich mixture.

14. The improved method as set forth in claim 13 wherein said rich fuel mixture includes an air to fuel ratio of less than 10 to 1.

15. The improved method as set forth in claim 14 wherein said rich fuel; mixture includes an air to fuel ratio of substantially 8 to 1.

16. The improved method as set forth in claim 12 wherein said lean mixture would have an air to fuel ratio in excess of 10 to 1.

17. The improved method as set forth in claim 16 wherein said lean mixture has an air to fuel ratio of substantially 12 to 1.

18. The improved method as set forth in claim 11 wherein said liquid fuel used in said method has a cetane rating such that it will auto-ignite at a predetermined pressure or temperature.

19. The improved method as set forth in claim 18 wherein the cetane rating of said air/gaseous mixture is such that it would not ignite at said predetermined pressure alone.

20. The improved method as set forth in claim 19 wherein said liquid fuel is diesel fuel oil.

21. The improved method as set forth in claim 11 wherein said torch cell includes a substantially spherical chamber, said passageway means being tangentially disposed relative to said torch cell chamber to provide a swirling effect on said compressed gaseous mixture introduced into said torch cell chamber from said cylinder chamber.

22. The improved method as set forth in claim 21 wherein said liquid fuel is introduced into said compressed swirling gaseous mixture at a predetermined angle to joint the flow thereof and insure complete combustion following ignition.

23. The improved method as set forth in claim 22 wherein said predetermined angle is between four and five degrees askew of the axis of said torch cell chamber whereby said liquid fuel is insured of total mixture with said compressed gaseous mixture that has been introduced via said passageway means.

* * * * *